United States Patent
Ozawa et al.

(10) Patent No.: US 7,373,000 B2
(45) Date of Patent: May 13, 2008

(54) IMAGE PROCESSING APPARATUS

(75) Inventors: Kaitaku Ozawa, Amagasaki (JP); Kenichi Takahashi, Osaka (JP); Munehiro Nakatani, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 788 days.

(21) Appl. No.: 10/735,911

(22) Filed: Dec. 16, 2003

(65) Prior Publication Data

US 2004/0179741 A1  Sep. 16, 2004

(30) Foreign Application Priority Data

Mar. 14, 2003  (JP)  ............... P2003-069592

(51) Int. Cl.
G06K 9/36 (2006.01)
(52) U.S. Cl. ............................... 382/232
(58) Field of Classification Search ........... 382/232, 382/240, 239
See application file for complete search history.

(56) References Cited

U.S. PATENT DOCUMENTS 6,978,048 B1 * 12/2005 Higginbottom et al. ..... 382/240
2002/0154826 A1 * 10/2002 Okada ..................... 382/240
2002/0196970 A1 * 12/2002 Sano et al. ............... 382/166
2004/0141650 A1 * 7/2004 Hansson et al. ........... 382/232

FOREIGN PATENT DOCUMENTS

| JP | 10-173855 | 6/1998 |
|----|-----------|--------|
| JP | 2002-247580 | 8/2002 |

* cited by examiner

*Primary Examiner*—Jingge Wu
*Assistant Examiner*—Amara Abdi
(74) *Attorney, Agent, or Firm*—Buchanan Ingersoll & Rooney PC

(57) ABSTRACT

An image processing apparatus for performing at least one of JPEG 2000 encoding and decoding processes, including: a JPEG 2000 hardware encoder-decoder including a memory that performs wavelet transform and inverse transform of image information up to a specific tile size using only hardware components; an acquirer for acquiring a tile size information of image data to be encoded or decoded; a determiner for determining whether the acquired tile size can be processed using only said JPEG 2000 hardware encoder-decoder or not; a selector for selecting one of a first and second process based on result of a decision by said determiner, the first process being wavelet transform and inverse transform process performed using only components constituting said JPEG 2000 hardware encoder-decoder and the second process being wavelet transform and inverse transform process performed using components other than components constituting said JPEG 2000 hardware encoder-decoder.

5 Claims, 11 Drawing Sheets

IMAGE PROCESSING APPARATUS

This application is based on application No. 2003-069592 filed in Japan, the contents of which is hereby incorporated by reference.

BACKGROUND OF THE INVENTION

1. Field of the Invention

The present invention directs to an image processing apparatus having a Codec (encoder/decoder) for JPEG 2000 file which performs encoding process and decoding process in JPEG 2000 format.

2. Description of the Related Art

Presently, a JPEG format has been generally used as an encoding format to compress a still image, which compresses an image data using a discrete cosine transform. However, in late years, for the purpose of providing improved compression performance and extended function, development and distribution of a JPEG 2000 format has been promoted, which compresses an image data using a wavelet transform.

Generally, in an image processing apparatus which can process JPEG 2000 file, a processor for JPEG 2000 file is constituted by a hardware device to satisfy request for high speed process of JPEG 2000 file. However, in this case, upper limit of tile size (for example, 128×128 pixels) which can be processed by said hardware device is determined inevitably based on capacity of memory for wavelet transform and inverse transform contained in said processor. Accordingly, since capacity over that of memory for wavelet transform and inverse transform is necessary for the tile size more than the upper limit, the wavelet transform and inverse transform process can not be performed using hardware components.

In case of employing a processor for JPEG 2000 file composed of hardware components, regardless of the above problem, in general, when JPEG 2000 file is generated by a terminal device such as personal computer and the like, tile size is often set large to reduce tile noise which is noticeable on boundary between adjacent tiles or in the vicinity of the boundary. Similarly, it is anticipated that when JPEG 2000 file is generated by an image processing apparatus, it is often required to set a tile size large to reduce tile size.

Conventionally, in case of employing a processor for JPEG 2000 file composed of hardware components, there was no other choice except for abandoning the process itself for JPEG 2000 file having tile size which cannot be processed using memory for wavelet transform and inverse transform. On the contrary, as a technique which can accomplish process for any tile size, it is known that all processes for JPEG 2000 file including wavelet transform and inverse transform are performed without using hardware components as disclosed in Japanese Patent laid-open publication 2002-247580.

However, when all processes for JPEG 2000 file are performed, a prolonged time is required for the processes using only software while being able to process any tile size without limitation.

SUMMARY OF THE INVENTION

It is an object of the present invention to provide an image processing apparatus which can rapidly perform JPEG 2000 encoding and decoding processes while being able to process any tile size.

In an aspect of the present invention, there is provided an image processing apparatus for performing at least one of JPEG 2000 encoding and decoding processes, comprising: a JPEG 2000 hardware encoder-decoder which has a memory for wavelet transform and inverse transform with a specific capacity and performs wavelet transform and inverse transform of image information up to said specific tile size using said memory by only hardware components; an acquirer of tile size information for acquiring a tile size information of image data to be encoded or decoded; a determiner for determining whether said tile size acquired by said acquirer can be processed using only components constituting said JPEG 2000 hardware encoder-decoder or not; a selector for selecting one of a first process and a second process based on result of decision by said determiner, the first process being wavelet transform and inverse transform process performed using only components constituting said JPEG 2000 hardware encoder-decoder and the second process being wavelet transform and inverse transform process performed using components other than components constituting said JPEG 2000 hardware encoder-decoder.

The second process may be process using software for wavelet transform and inverse transform.

Alternatively, the second process may be process using a memory separate from said memory for wavelet transform and inverse transform.

According to the present invention, JPEG 2000 encoding and decoding processes can be performed more rapidly for any tile size set for JPEG 2000 file, compared with the case in which all processes including wavelet transform and inverse transform are processed using software.

DETAILED DESCRIPTION OF THE PREFERRED EMBODIMENTS

Embodiments of the present invention will be described below with reference to the accompanying drawings.

First Embodiment

Figure 1:
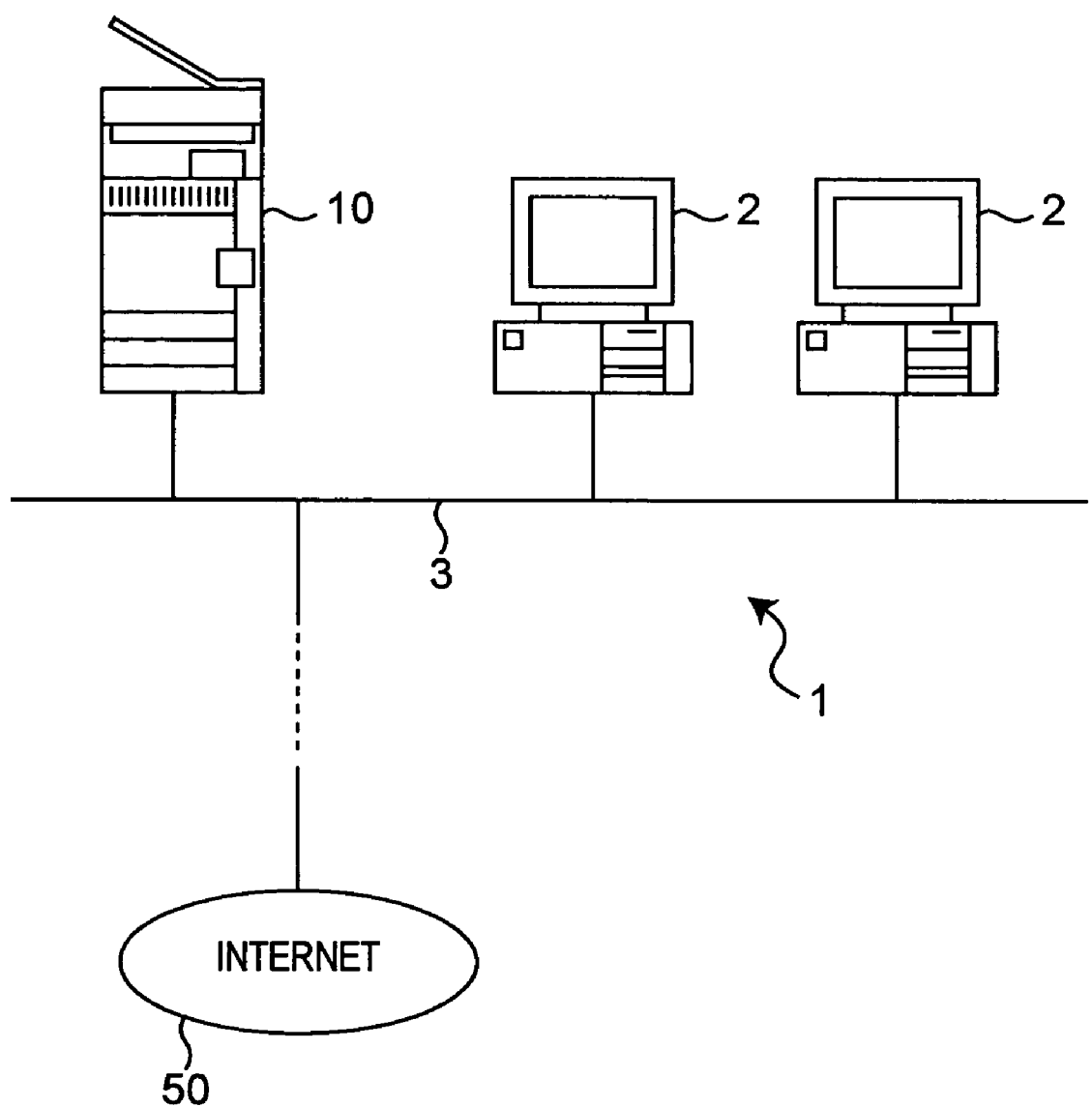
FIG. 1 is a schematic diagram illustrating a network system including Multifunction Peripherals (hereafter denoted as MFP) according to one embodiment of the present invention.

FIG. 1 is a schematic diagram illustrating a network system including MFP according to one embodiment of the present invention. This network system 1 has a MFP 10 which serves as printer, facsimile, copier, scanner and the like, and a plurality of terminal devices such as personal computer. These instruments are connected with each other via a network bus 3 allowing the instruments to transmit and receive data. In this network system 1, for example, it is possible to transmit information data (eg. image data) from terminal device 2 to MFP 10 for print, or to acquire information data by reading manuscript by scanner 11 (See FIG. 2) of MFP 10 and transmit this information data to terminal device 2 for storage.

Furthermore, this network 1 may be connected to Internet 50 via a network bus 3. In this case, MFP 10 can receive information data, for example from remote terminal device located on the other network via Internet 50 and print it out if necessary.

Figure 2:
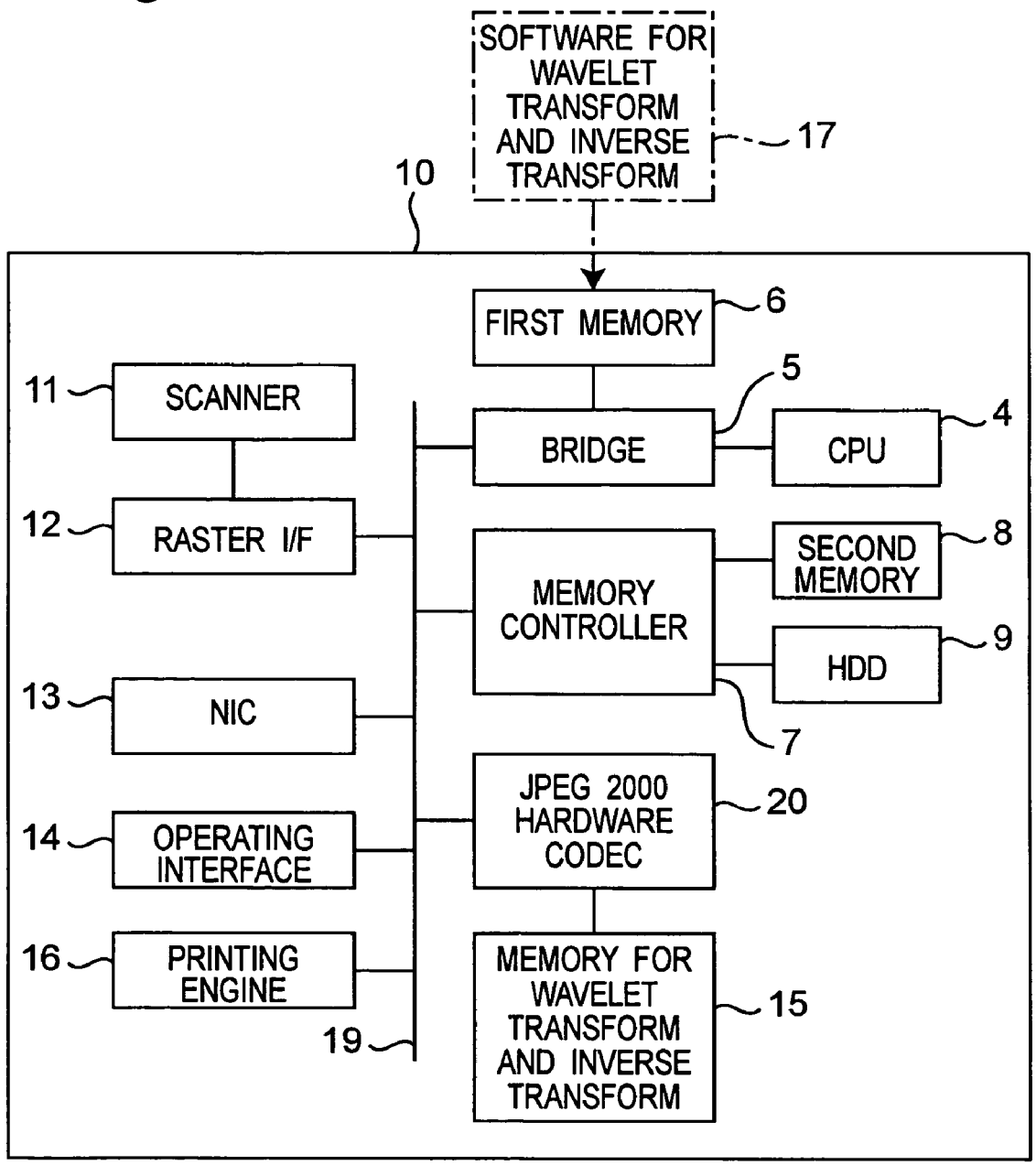
FIG. 2 is a block diagram illustrating whole configuration of said MFP.

FIG. 2 is a block diagram illustrating whole configuration of MFP 10. MFP 10 can perform JPEG encoding and decoding processes, and comprise a CPU 4 for controlling components in MFP 10 by forcing the components to perform various commands based on a predetermined operating program, a first memory 6 connected with CPU 4 via a bridge 5 for storing the operating program and the like, a memory controller 7, a built-in type of second memory 8, which is connected with other components in MFP 10 via memory controller 7, a JPEG 2000 hardware Codec 20 which is a hardware component for performing JPEG 2000 encoding and decoding processes, and a memory 15 for wavelet transform and inverse transform, which is used when JPEG 2000 hardware Codec 20 performs wavelet transform and inverse transform. A external hard disk drive 9 (denoted as "HDD" in FIG. 2) is connected with memory controller 7 as well as second memory 8

MFP 10 further has a scanner 11 for scanning manuscript to acquire an image data in bitmap format, a raster interface 12 (denoted as "raster I/F" in FIG. 2) for inputting the image data acquired from scanner 11 to data processing components in MFP 10, a network interface card 13 (denoted as "NIC" in FIG. 2) connected with external instruments on network system 1 (see FIG. 1) as data input/output port, an operating interface 14 by which user performs setting of various parameters such as tile size, a print engine 16 for printing image on a sheet based on the image data acquired by scanner 11 or transmitted from external. These components are connected with each other via bus 19 and the like allowing the components to transmit and receive data.

In MFP 10 having components as described above, an image data in bitmap format acquired by scanning manuscript on scanner 11 or input from external via NIC 13 can be encoded to convert it to JPEG 2000 file. Adversely, a JPEG 2000 file input from external via NIC 13 can be decoded to convert it to image data in bitmap format. In encoding and decoding processes, JPEG 2000 hardware Codec 20 makes reference to a tile size information set by user using operating interface 13 or included in JPEG 2000 file, and performs wavelet transform and inverse transform based on the tile size basically using memory 15 for wavelet transform and inverse transform.

Since memory 15 for wavelet transform and inverse transform has a specific memory capacity, upper limit of tile size can be processed using memory 15 is inevitably predetermined. Accordingly, if the referred tile size is above the upper limit of tile size, it is not possible to process a bitmap data or JPEG 2000 file using only memory 15 for wavelet transform and inverse transform. To overcome this problem, in the first embodiment, when tile size which cannot be processed using only memory 15 for wavelet transform and inverse transform is set, the encoding and decoding processes are employed in which wavelet transform and inverse transform can be performed more rapidly. The encoding and decoding processes employed in the first embodiment will be described below.

Figure 3:
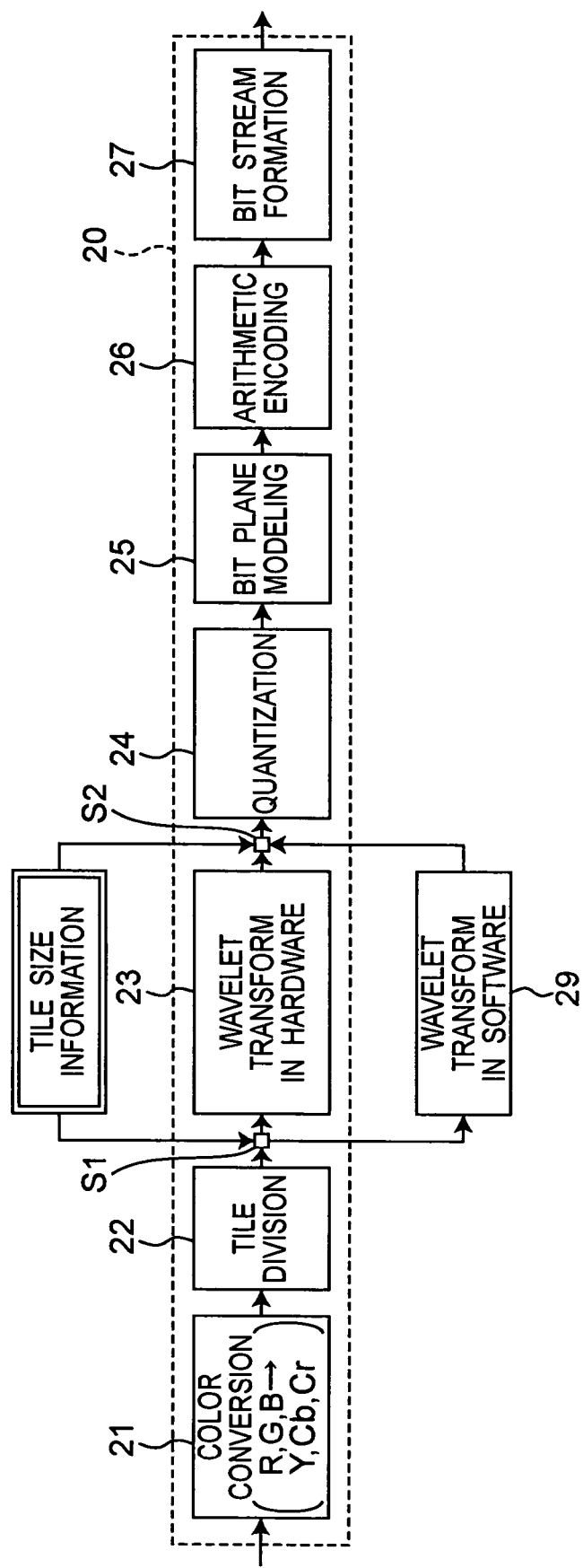
FIG. 3 is an explanatory diagram illustrating flow of process of encoding bitmap image data to generate JPEG 2000 file.

FIG. 3 is an explanatory diagram illustrating flow of process of encoding bitmap image data to generate JPEG 2000 file. In FIG. 3, exterior frame by dashed line denotes JPEG 2000 hardware Codec 20 and blocks within the exterior frame denote processes performed by JPEG 2000 hardware Codec 20.

In this encoding process, first, color conversion process (block 21) is performed to an input image data in bitmap format for improving compression efficiency. As a result of the color conversion process, R, G, B signals are converted to Y, Cb, Cr color space. "Y" represents brightness component, and "Cb", "Cr" represent color difference components. Then, tile division process (block 22) is performed based on tile size set by user using operating interface 14, and thus, an image data is divided to a plurality of tiles, each of which has the tile size. From then on, various processes including wavelet transform process are performed by the tile.

Following tile division process, wavelet transform process is performed. In advance of substantial wavelet transform process, it is determined whether the tile size set by user using operating interface 14 can be processed using only hardware components for wavelet transform, that is, JPEG 2000 hardware Codec 20 and memory 15 for wavelet transform and inverse transform. When it is determined that the tile size can be processed, substantial wavelet transform process (block 23) is performed using hardware components, on the other hand, when it is determined that tile size cannot be processed, a process using software 17 (See FIG. 2) denoted as block 29 is selected for wavelet transform process, and process using hardware components (block 23) is switched to process using software 17 (block 29) by a selector S1. Software 17 employed in wavelet transform process is stored in a built-in recording medium such as first memory 15 or an external recording medium such as CD-ROM (not shown) and read out in response to switching motion of selector S1.

As a result of wavelet transform process as described above, image data is divided by the tile to a plurality of subbands. After substantial wavelet transform process, a source of subband data is switched between hardware components and the components used in performing software process by a selector S2 based on the tile size set by user.

And then, quantization process (block 24) is performed by each tile. Furthermore, bit plane modeling process (block 25) is performed to the quantized subbands. In this bit plane modeling process, a quantized wavelet coefficient is divided to a plurality of units, each of which is referred to as code block, for subsequent arithmetic encoding process, and each code block is represented as a bit plane. Then, arithmetic encoding process (block 26) is performed to encoded strings acquired by the bit plane modeling process. Thereafter, a bit stream is formed by arithmetic encoded bit strings (block 27). Through the processes as described above, a JPEG 2000 file is acquired.

Figure 4:
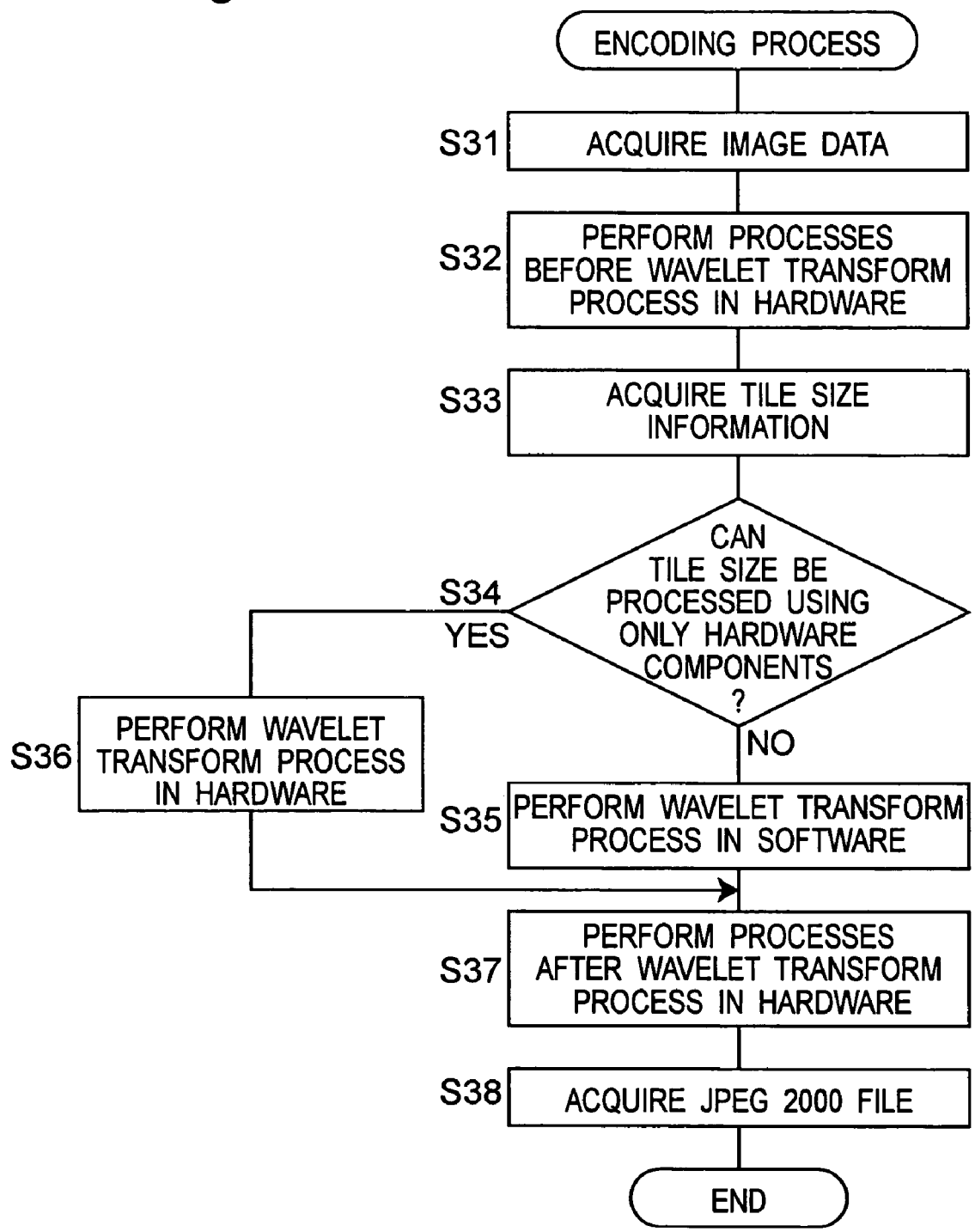
FIG. 4 is a flow chart of encoding process according to the first embodiment of the present invention.

FIG. 4 is a flow chart of encoding process as described above. In this encoding process, first, an image data is acquired (step 31), and a JPEG 2000 hardware Codec 20 performs hardware processes (color conversion and tile division processes) before wavelet transform process (step 32). Then, information of tile size set by user using operation portion 14 is acquired (step 33), and the tile size is estimated based on memory capacity of memory 15 for wavelet transform and inverse transform, which is attached to JPEG 2000 hardware Codec 20 to determine whether bitmap data with the tile size can be processed using only hardware components, that is, JPEG 2000 hardware Codec 20 and memory 15 for wavelet transform and inverse transform (step 34).

As a result of step 34, when it is determined that a bitmap data with the tile size can be processed using only hardware components, the wavelet transform process is performed to the bitmap data using JPEG 2000 hardware Codec 20 and memory 15 (step 36).

On the other hand, as a result of 34, when it is determined that a bitmap data with the tile size cannot be processed using only hardware components, software 17 for wavelet transform and inverse transform is read out and the wavelet transform process is performed to the bitmap data using the software (step 35).

Following steps 35 and 36, processes after wavelet transform process (quantization, bit plane modeling, arithmetic encoding, bit stream formation) are performed using hardware components (step 37). And thus, a JPEG 2000 file is acquired (step 38). This is the end of the encoding process.

Figure 5:
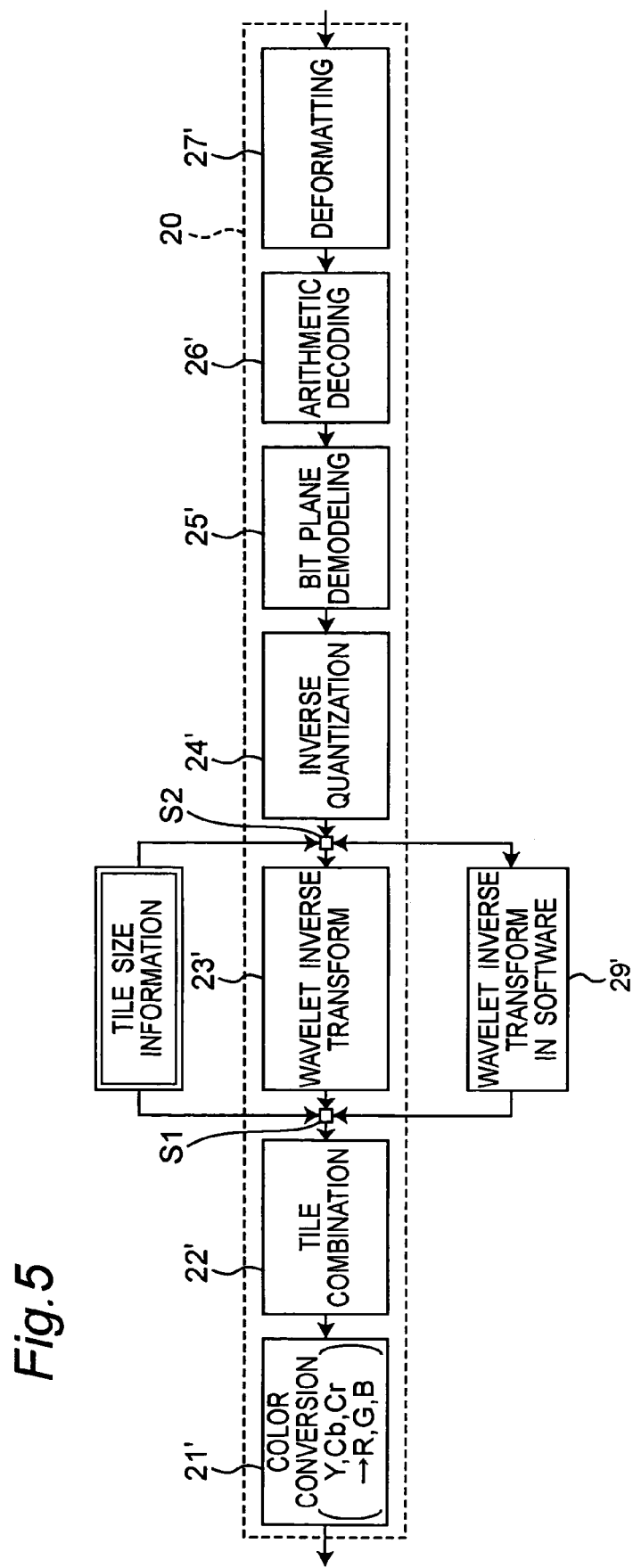
FIG. 5 is an explanatory diagram illustrating flow of process of decoding JPEG 2000 file to generate bitmap image data according to the first embodiment of the present invention.

Subsequently, process of decoding JPEG 2000 file to generate an image data in bitmap format will be described below. FIG. 5 is an explanatory diagram illustrating flow of process of decoding JPEG 2000 file to generate an image data. In FIG. 5, exterior frame by dashed line denotes JPEG 2000 hardware Codec 20 and blocks within the exterior frame denote processes performed by JPEG 2000 hardware Codec 20, as well as in FIG. 3.

In this decoding process, first, deformatting process (block 27') is performed to an input JPEG 2000 file. In deformatting process, encoded strings of JPEG 2000 file in which data are arranged in order of image quality or resolution are analyzed and rearranged to adapt to the following arithmetic decoding process. Next, the arithmetic decoding process (block 26') is performed to encoded data after deformatting. As a result, arithmetic decoded data is under the condition in which it is divided to a plurality of bit planes parallel to each other.

Subsequently, bit plane demodeling process (block 25') is performed. In demodeling process, a bit plane is arranged to code block. Then, if JPEG 2000 file is of being quantized precedently, inverse quantization process (block 24') is performed.

Following inverse quantization process, wavelet inverse transform process is performed. In this wavelet inverse transform process, in advance of substantial wavelet inverse transform process, information of tile size is extracted from header (see FIG. 11) of JPEG 2000 file and it is determined whether this process can be performed using only hardware components for wavelet inverse transform, that is, JPEG 2000 hardware Codec 20 and memory 15 for wavelet transform and inverse transform, based on the tile size. As a result, when it is determined that this process can be performed, consecutively, wavelet inverse transform process (block 23') is performed by hardware components, and on the other hand, when it is determined that this process cannot be performed, a process using software 17 (block 29') is selected for wavelet inverse transform process, and process using hardware components (block 23') is switched to process using software 17 (block 29') by a selector S2. Software 17 employed in wavelet inverse transform process is stored in a built-in recording medium such as first memory 15 or an external recording medium such as CD-ROM (not shown) and read out in response to switching motion of selector S2.

As a result of wavelet inverse transform process, encoded data is subband synthesized by a tile, and therefore, a variety of color components are generated. After substantial wavelet inverse transform process, a source of data is switched between hardware components and the components used in performing software process by a selector S1 based on the tile size extracted from header of JPEG 2000 file.

Then, tile combination process is performed, and tiles are integrated, and image data composed of Y, Cb, Cr components is acquired. Thereafter, various processes are performed by an image data. Finally, color conversion process is performed, and thus, Y, Cb, Cr color space is converted to RGB signals. This is the end of decoding process, and as a result, an image data is acquired.

Figure 6:
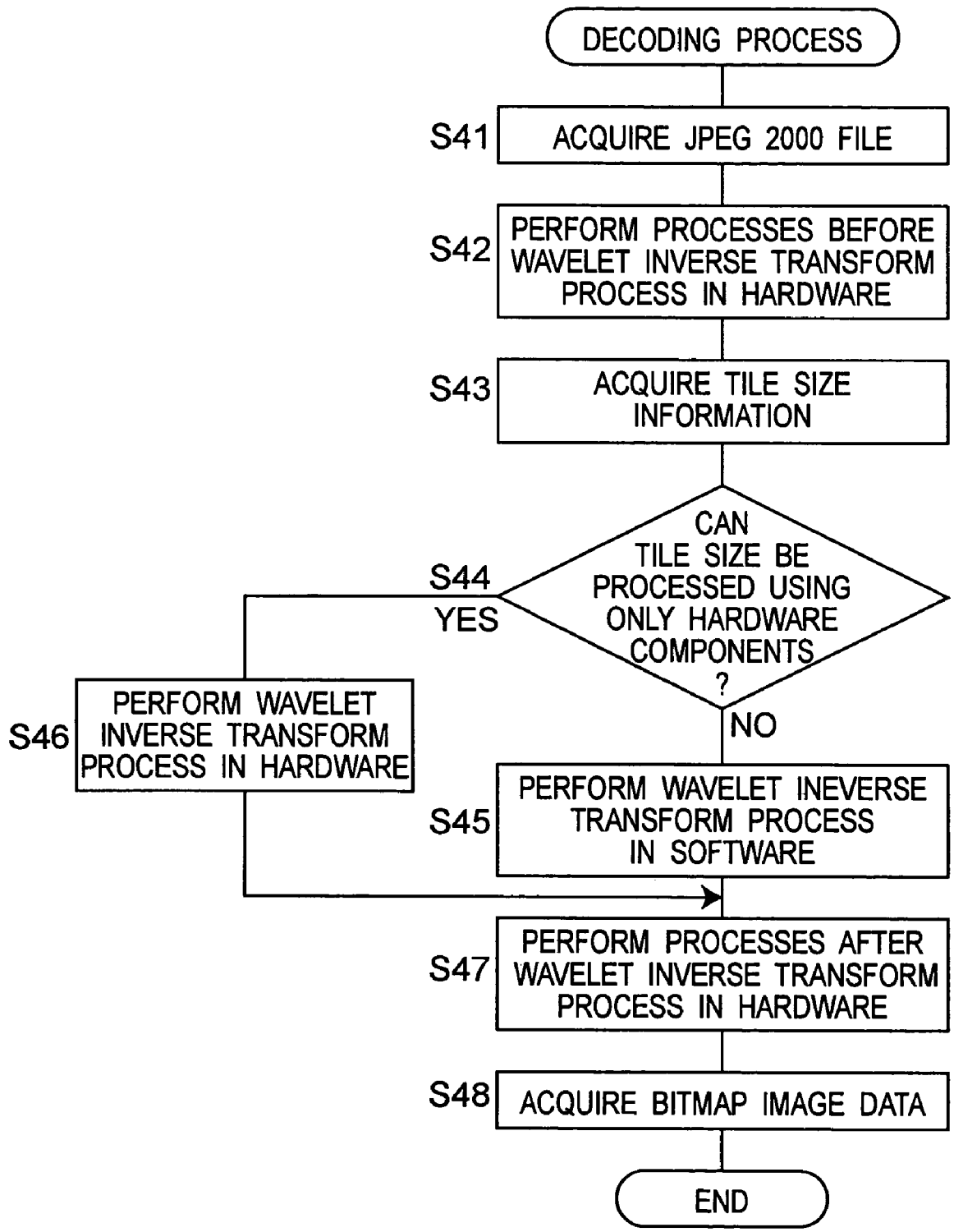
FIG. 6 is a flow chart of decoding process according to the first embodiment of the present invention.

FIG. 6 is a flow chart of decoding process as described above. In this decoding process, first, if JPEG 2000 file is acquired (step 41), hardware processes before wavelet inverse transform are performed by JPEG 2000 hardware Codec (step 42). Then, information of tile size is acquired by extracting from header of JPEG 2000 file (step 43) and the tile size is estimated based on capacity of memory 15 attendant on JPEG 2000 hardware Codec 20 to determine whether the tile size can be processed using only hardware components (step 44).

As a result of step 44, when it is determined that the tile size can be processed using only hardware components, continuously, data to be processed is processed in hardware by JPEG 2000 hardware Codec 20 and memory 15 for wavelet transform and inverse transform (step 46).

On the other hand, as a result of step 44, when it is determined that the tile size cannot be processed using only hardware components, continuously, software 18 for wavelet transform and inverse transform is read out and data to be processed is processed in software (step 45).

After steps 45 and 46, processes following wavelet inverse transform are performed in hardware by JPEG 2000 hardware Codec 20 (step 47), and thus, an image data in bitmap format is acquired (step 48). This is the end of the decoding process.

As apparent from the above description, according to first embodiment, in performing wavelet transform and inverse transform, it is possible to accommodate the tile size which cannot be processed using only hardware components by switching to process using software. In performing wavelet transform and inverse transform, by switching to software process based on the tile size, it is possible to process faster than the case in that all processes including wavelet transform and inverse transform process are performed using software.

Second Embodiment

In the first embodiment as described above, when the tile size which cannot be processed using only hardware components is set, wavelet transform and inverse transform process are performed using software. However the present invention is not limited to such embodiment and wavelet transform and inverse transform process may be performed using a memory separate from memory 15 for wavelet transform and inverse transform. The encoding and decoding processes including such wavelet transform and inverse transform will be described below.

Figure 7:
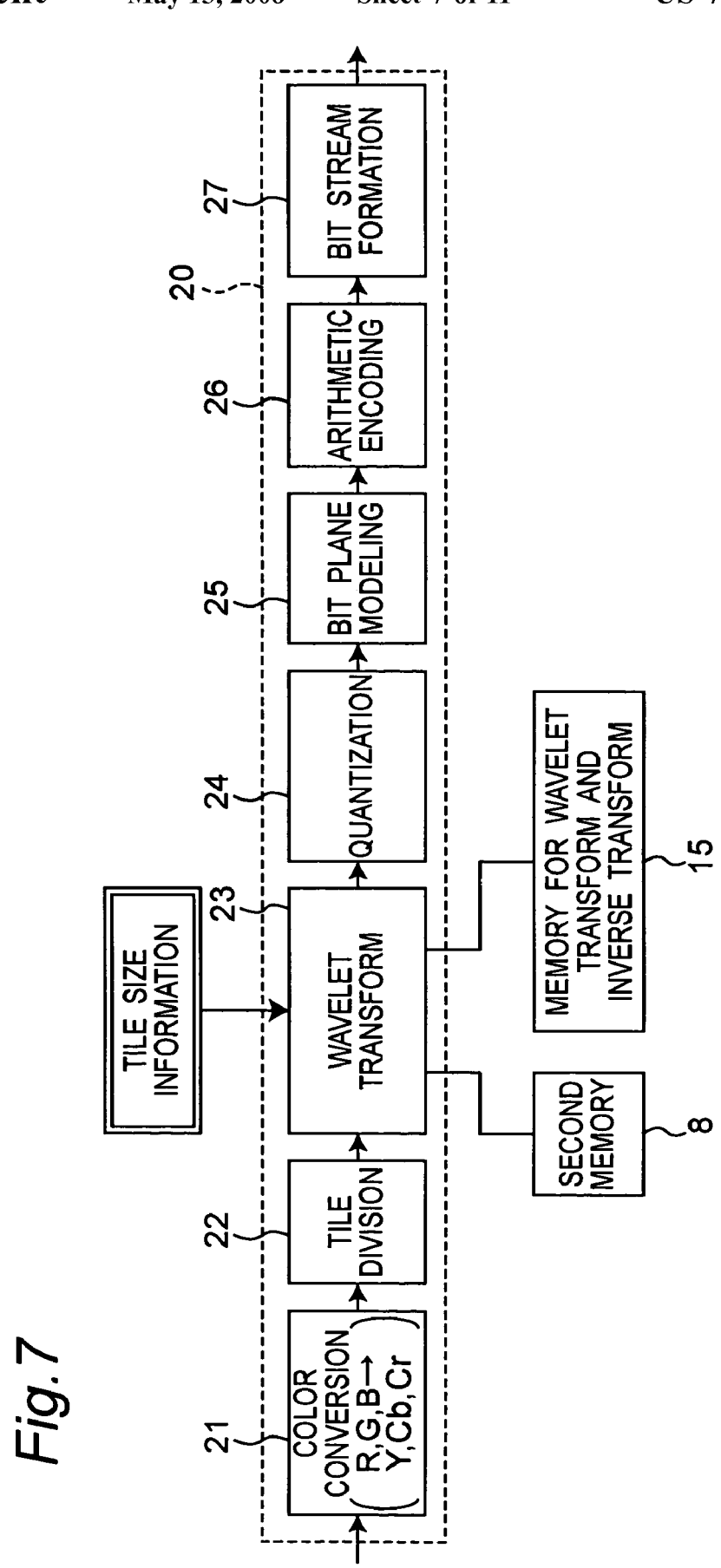
FIG. 7 is an explanatory diagram illustrating flow of process of encoding bitmap image data to generate JPEG 2000 file according to the second embodiment of the present invention.

FIG. 7 is an explanatory diagram illustrating flow of process of encoding a bitmap image data to generate JPEG 2000 file according to the second embodiment of the present invention. In FIG. 7, exterior frame by dashed line denotes JPEG 2000 hardware Codec 20 and blocks within the exterior frame denote processes performed by JPEG 2000 hardware Codec 20. The description of processes before wavelet transform, that is, color conversion process (block 21) and tile division process (block 22) and of processes after wavelet transform, that is, processes from quantization process (block 24) will be omitted since the processes are similar to those of first embodiment.

In this encoding process, in advance of substantial wavelet transform process, it is determined whether the tile size set by user using operating interface 14 can be processed using only hardware components for wavelet transform, that is, JPEG 2000 hardware Codec 20 and memory 15 for wavelet transform and inverse transform. When it is determined that the tile size can be processed, substantial wavelet transform process (block 23) is performed using hardware components, on the other hand, when it is determined that tile size cannot be processed, wavelet transform process is switched from a process using memory 15 for wavelet transform and inverse transform to a process using a memory (e.g. second memory 8) separate from memory 15. Second memory 8 has a capacity larger than that of memory 15 and can accommodate the tile size which cannot be processed using memory 15. It is noted that a selector (not shown) is provided in JPEG 2000 hardware Codec 20 between memory 15 for wavelet transform and inverse transform and second memory 8 to switch a memory to be used.

According to such wavelet transform process, an image data is subband divided by each tile. After substantial wavelet transform process, a source of subband data is switched between memory 15 for wavelet transform and inverse transform and second memory 8 by a selector based on the tile size set by user using operating interface 14.

Figure 8:
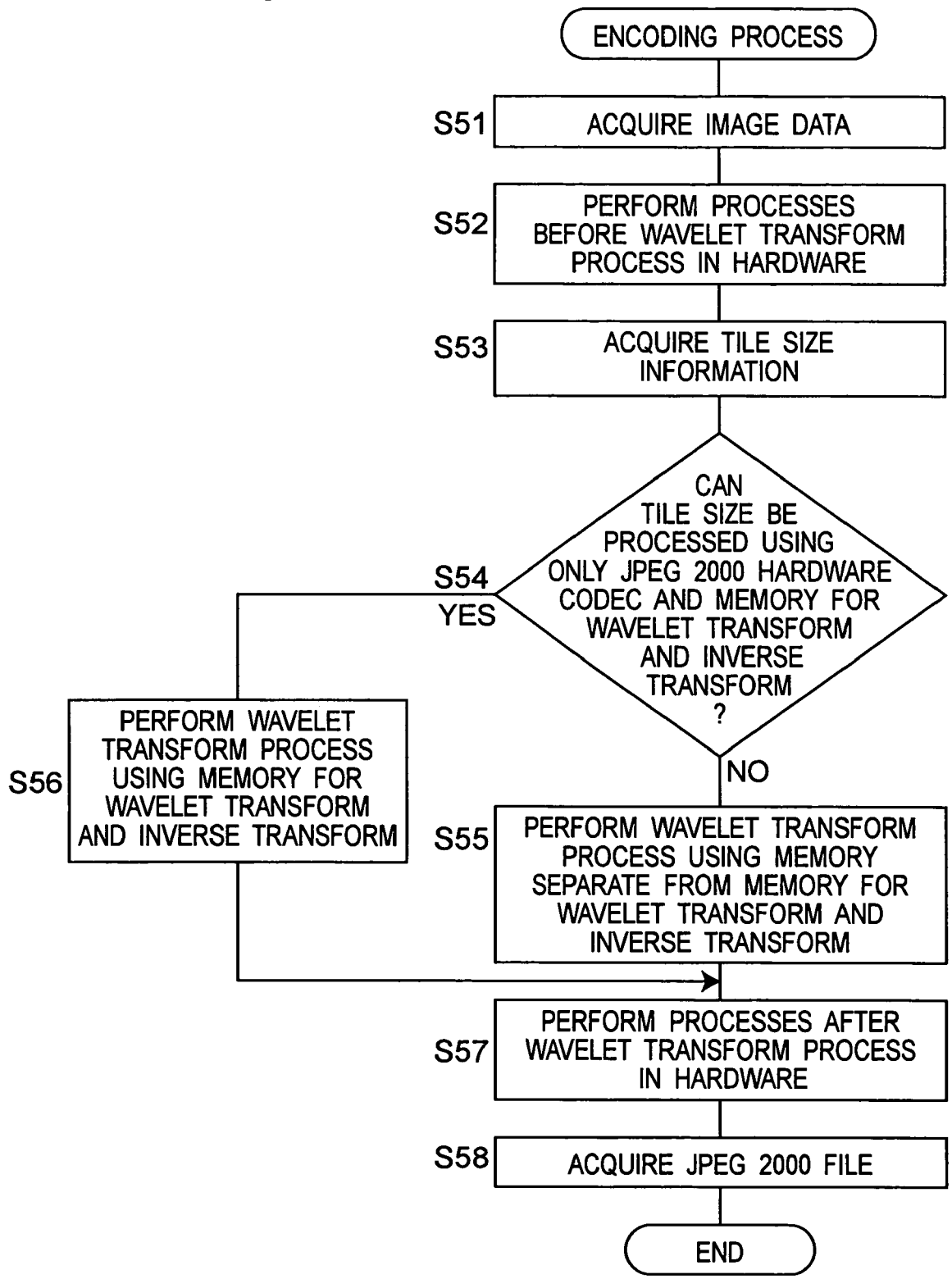
FIG. 8 is a flow chart of encoding process according to the second embodiment of the present invention.

FIG. 8 is a flow chart of encoding process according to second embodiment as described above. In this encoding process, first, if image is acquired (step 51), hardware processes before wavelet transform are performed by JPEG 2000 hardware Codec (step 52). Then, information of tile size set by user using operating interface 14 is acquired (step 53) and the tile size is estimated based on capacity of memory 15 attendant on JPEG 2000 hardware Codec 20 to determine whether the tile size can be processed using only JPEG 2000 hardware Codec 20 and memory 15 (step 54).

As a result of step 54, when it is determined that the tile size can be processed using only JPEG 2000 hardware Codec 20 and memory 15, continuously, data to be processed is processed in hardware by JPEG 2000 hardware Codec 20 and memory 15 for wavelet transform and inverse transform (step 56).

On the other hand, as a result of step 54, when it is determined that the tile size cannot be processed using only JPEG 2000 hardware Codec 20 and memory 15, continuously, wavelet transform process is performed using JPEG 2000 hardware Codec 20 and a memory (e.g. second memory 8) separate from memory 15 for wavelet transform and inverse transform (step 55).

After steps 55 and 56, processes following wavelet transform are performed in hardware by JPEG 2000 hardware Codec 20 (step 57), and thus, a JPEG 2000 file is acquired (step 58). This is the end of the encoding process.

Figure 9:
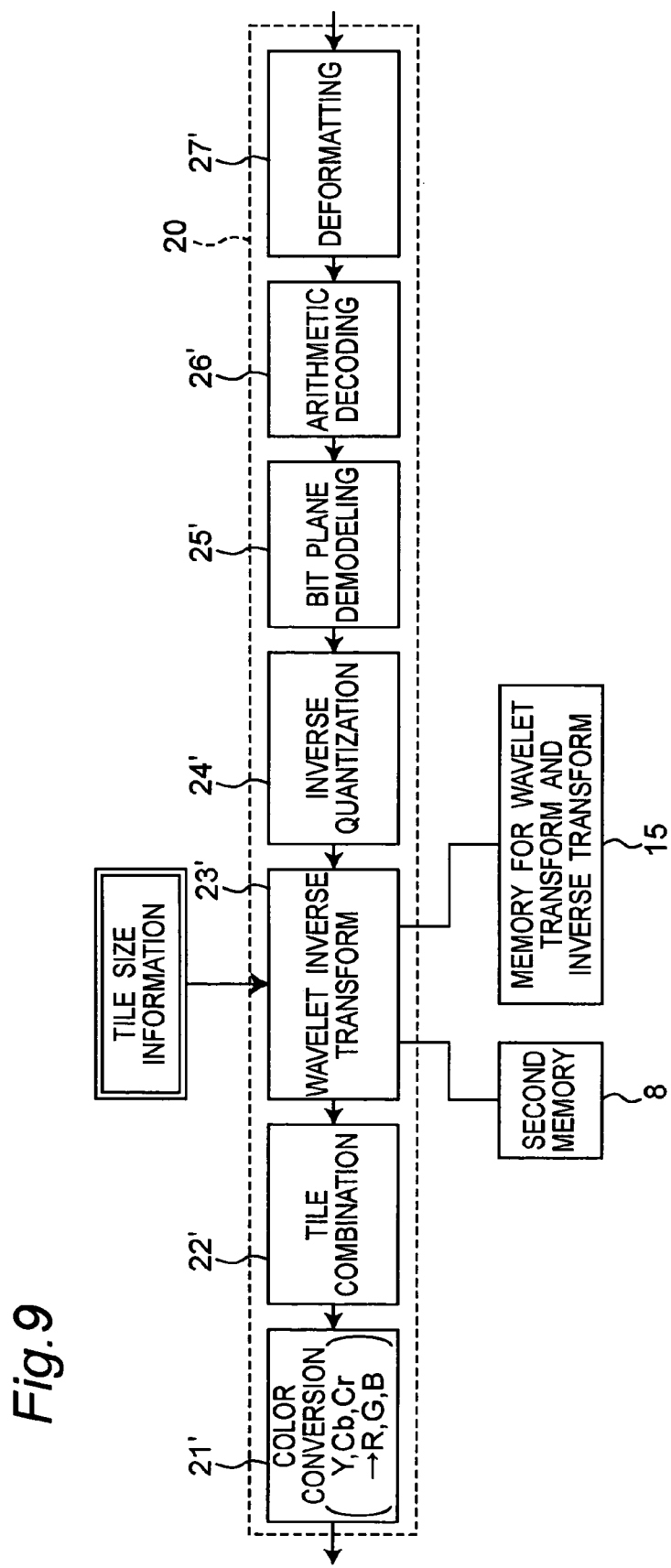
FIG. 9 is an explanatory diagram illustrating flow of process of decoding JPEG 2000 file to generate bitmap image data according to the second embodiment of the present invention.

FIG. 9 is an explanatory diagram illustrating flow of process of decoding JPEG 2000 file to generate bitmap image data according to the second embodiment of the present invention. The description of processes before wavelet inverse transform, that is, processes from deformatting process (block 27') to inverse quantization process (block 24') and of processes after wavelet inverse transform, that is, tile combination process (block 22') and color conversion process (block 21') will be omitted since the processes are similar to those of first embodiment.

In this decoding process, in advance of substantial wavelet inverse transform process, information of tile size is extracted from header (see FIG. 11) of JPEG 2000 file and it is determined whether this process can be performed using only hardware components for wavelet inverse transform, that is, JPEG 2000 hardware Codec 20 and memory 15 for wavelet transform and inverse transform, based on the tile size. As a result, when it is determined that this process can be performed, consecutively, wavelet inverse transform process (block 23') is performed by hardware components, and on the other hand, when it is determined that this process cannot be performed, wavelet inverse transform process is switched from a process using memory 15 for wavelet transform and inverse transform to a process using second memory 8 separate from memory 15. This switching motion is performed using a selector as well as the encoding process.

As a result of such wavelet inverse transform process, encoded data is subband synthesized and therefore various color components are generated. After substantial wavelet inverse transform process, a source of data is switched between memory 15 for wavelet transform and inverse transform and second memory 8 by a selector based on the tile size extracted from header of JPEG 2000 file.

Figure 10:
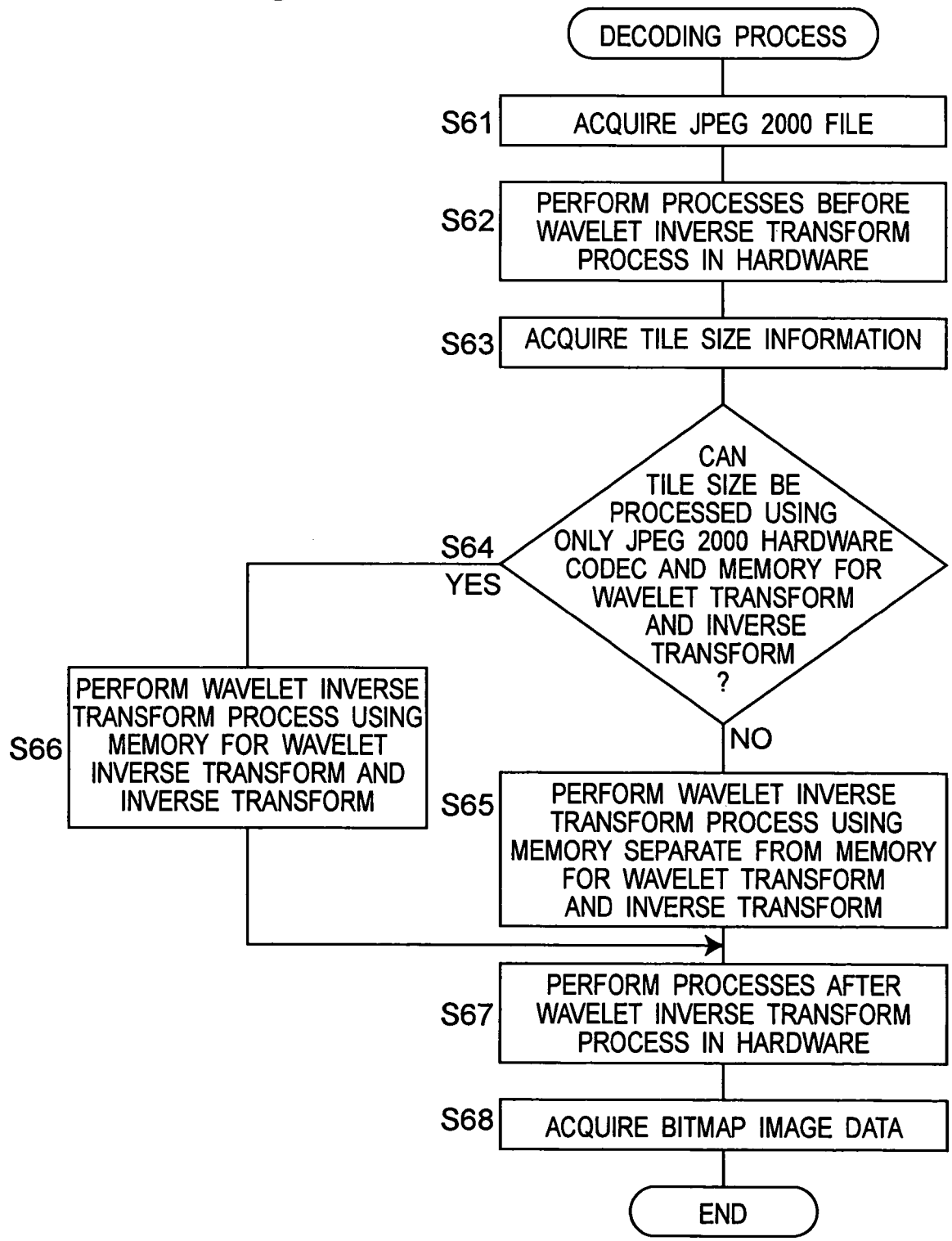
FIG. 10 is a flow chart of decoding process according to the second embodiment of the present invention.

FIG. 10 is a flow chart of decoding process according to the second embodiment of the present invention as described above.

In this decoding process, first, if JPEG 2000 file is acquired (step 61), hardware processes before wavelet inverse transform are performed in hardware by JPEG 2000 hardware Codec (step 62). Then, information of tile size is acquired by extracting from header of JPEG 2000 file (step 63) and the tile size is estimated based on capacity of memory 15 attendant on JPEG 2000 hardware Codec 20 to determine whether the tile size can be processed using only hardware components (step 64).

As a result of step 64, when it is determined that the tile size can be processed using only hardware components, continuously, data to be processed is processed in hardware by JPEG 2000 hardware Codec 20 and memory 15 for wavelet transform and inverse transform (step 66).

On the other hand, as a result of step 64, when it is determined that the tile size cannot be processed using only hardware components, continuously, wavelet inverse transform process is performed using second memory 8 separate from memory 15 for wavelet transform and inverse transform (step 65).

After steps 65 and 66, processes following wavelet inverse transform are performed in hardware by JPEG 2000 hardware Codec 20 (step 67), and thus, an image data in bitmap format is acquired (step 68). This is the end of the decoding process.

As apparent from the above description, according to second embodiment, in performing wavelet transform and inverse transform, it is possible to accommodate the tile size which cannot be processed using only hardware components by switching to process using a memory separate from memory 15 for wavelet transform and inverse transform. In performing wavelet transform and inverse transform, by switching between memory 15 for wavelet transform and inverse transform and a memory separate from memory 15 based on the tile size, it is possible to process faster than the case in that all processes including wavelet transform and inverse transform process are performed using software.

Figure 11:
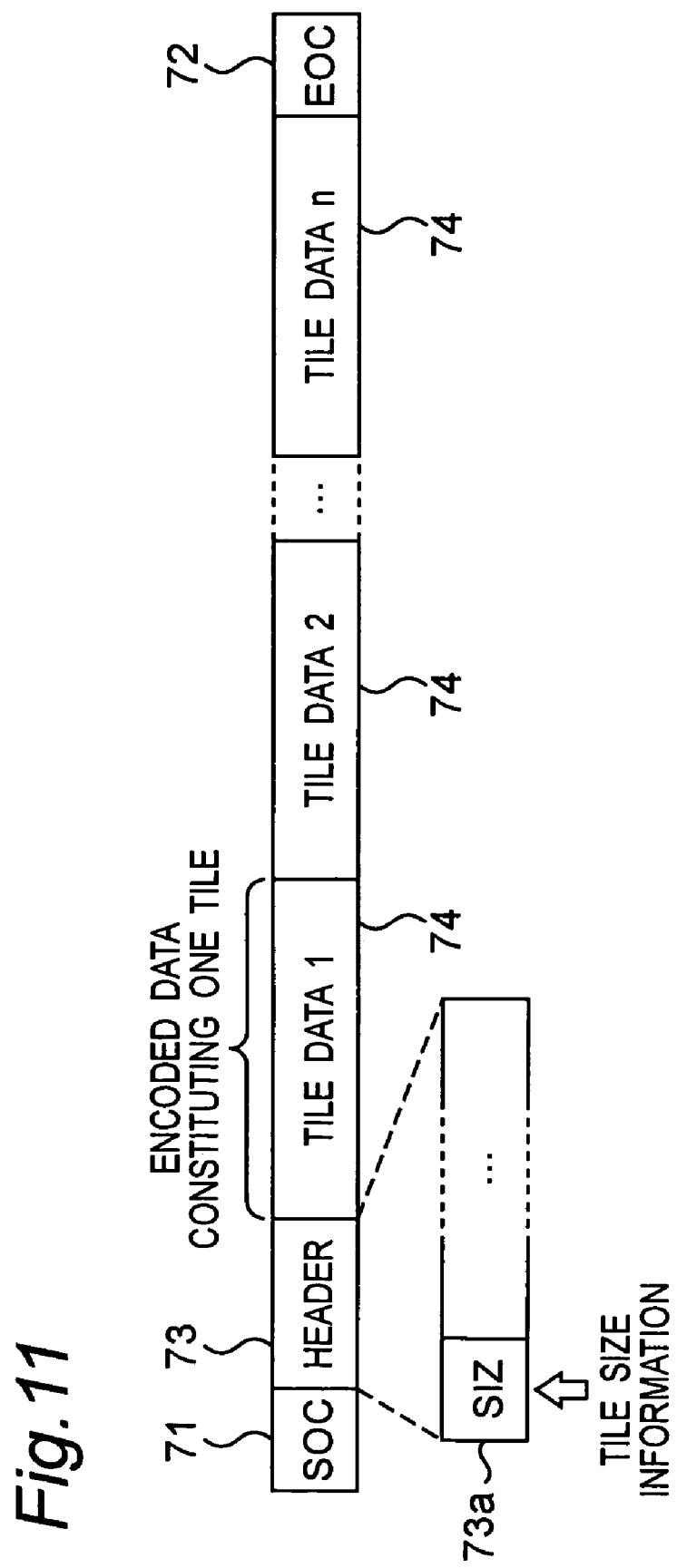
FIG. 11 is a schematic diagram showing a file of JPEG 2000.

Finally, with reference to FIG. 11, it will be described as to where to store the tile size in JPEG 2000 file. JPEG 2000 file is of being formed by encoding an image data using JPEG 2000 compression technology and adding necessary information such as header to encoded data to make it have file form, and typically has file structure as shown in FIG. 11. In this file structure, JPEG 2000 file has a SOC (start of codestream) marker 71 on the start of file and an EOC (end of codestream) marker 72 on the end of file. There are a header 73 and tile data 74 corresponding to a number of tiles following header 73 between SOC marker 71 and EOC marker 72. Each tile data 74 corresponds to encoded data of one tile. A SIZ marker 73a is included in header 73 and information of tile size is included in SIZ marker 73a.

While the invention has been shown and described in detail, the foregoing description is in all aspects illustrative and not restrictive. It is therefore understood that numerous other modifications and variations can be devised without departing from the scope of the invention. In the embodiments, an example in which the present invention is applied to a stand-alone MFP 10 is described, but it is not limited to such example, and the present invention may be applied to a system composed of discrete instruments such as personal computer, display, scanner and the like.

What is claimed is:

1. An image processing apparatus for performing at least one of JPEG 2000 encoding and decoding processes, comprising:
    a JPEG 2000 hardware encoder-decoder which has a memory for wavelet transform and inverse transform with a specific capacity and performs wavelet transform and inverse transform of image information up to a specific tile size using said memory by only hardware components;
    an acquirer of tile size information for acquiring a tile size information of image data to be encoded or decoded;
    a determiner for determining whether the tile size acquired by said acquirer can be processed using only components constituting said JPEG 2000 hardware encoder-decoder or not;
    a selector for selecting one of a first process and a second process based on a result of a decision by said determiner, the first process being a wavelet transform and inverse transform process performed using only components constituting said JPEG 2000 hardware encoder-decoder and the second process being a wavelet transform and inverse transform process performed using other components than the components constituting said JPEG 2000 hardware encoder-decoder.

2. The image processing apparatus according to claim 1, wherein the other components include a computer readable medium storing computer program instructions which when executed by a computer programmed with the instructions causes the computer to perform the second process for wavelet transform and inverse transform.

3. The image processing apparatus according to claim 1, wherein the second process is a process using a memory separate from the memory for wavelet transform and inverse transform.

4. An image processing apparatus for performing JPEG 2000 encoding processes, comprising:
    a JPEG 2000 hardware encoder which has a memory for wavelet transform with a specific capacity and performs wavelet transform of image information up to a specific tile size using said memory by only hardware components;
    an operating interface for inputting tile size information of image data to be encoded;
    a determiner for determining whether the tile size input by said operating interface can be processed using only components constituting said JPEG 2000 hardware encoder or not;
    a selector for selecting one of a first process and a second process based on a result of a decision by said determiner, the first process being a wavelet transform process performed using only components constituting said JPEG 2000 hardware encoder and the second process a being wavelet transform process performed using other components than components constituting said JPEG 2000 hardware encoder.

5. An image processing apparatus for performing JPEG 2000 decoding processes, comprising:
    a JPEG 2000 hardware decoder which has a memory for wavelet inverse transform with a specific capacity and performs wavelet inverse transform of image information up to a specific tile size using said memory by only hardware components;
    an acquirer of tile size information for acquiring a tile size information included in the JPEG 2000 file;
    a determiner for determining whether the tile size acquired by said acquirer can be processed using only components constituting said JPEG 2000 hardware decoder or not;
    a selector for selecting one of a first process and a second process based on a result of a decision by said determiner, the first process being a wavelet inverse transform process performed using only components constituting said JPEG 2000 hardware decoder and the second process being a wavelet inverse transform process performed using other components than components constituting said JPEG 2000 hardware decoder.

* * * * *